United States Patent
Lin et al.

(10) Patent No.: US 8,479,027 B2
(45) Date of Patent: Jul. 2, 2013

(54) COMPUTER POWER SUPPLIER WITH A STANDBY POWER SAVING CONTROLLER

(75) Inventors: Wen-Tsung Lin, Taipei (TW); Yu-Hsun Lin, Taipei (TW)

(73) Assignee: J.R.J. Electronic Co., Ltd., Taipei (TW)

( * ) Notice: Subject to any disclaimer, the term of this patent is extended or adjusted under 35 U.S.C. 154(b) by 194 days.

(21) Appl. No.: 13/106,262

(22) Filed: May 12, 2011

(65) Prior Publication Data

US 2012/0290860 A1 Nov. 15, 2012

(51) Int. Cl.
*G06F 1/00* (2006.01)
(52) U.S. Cl.
USPC .......................................... 713/300
(58) Field of Classification Search
USPC .......................................... 713/300; 323/355
See application file for complete search history.

(56) References Cited

U.S. PATENT DOCUMENTS

| | | | |
|---|---|---|---|
| 5,768,600 A * | 6/1998 | Williams | 713/300 |
| 5,808,881 A * | 9/1998 | Lee | 363/37 |
| 7,133,293 B2 * | 11/2006 | Fiorentino et al. | 361/752 |
| 7,330,351 B2 * | 2/2008 | Chien | 361/679.48 |
| 8,344,546 B2 * | 1/2013 | Sarti | 307/64 |
| 2007/0096562 A1 * | 5/2007 | Bainbridge et al. | 307/35 |
| 2009/0267418 A1 * | 10/2009 | Lin et al. | 307/66 |
| 2011/0246795 A1 * | 10/2011 | Kuo | 713/300 |
| 2011/0298279 A1 * | 12/2011 | Dimrco et al. | 307/31 |

* cited by examiner

*Primary Examiner* — Mark Connolly
(74) *Attorney, Agent, or Firm* — Egbert Law Offices, PLLC

(57) ABSTRACT

A computer power supplier with a built-in power saving controller has a power input socket connected to external AC power supply. A DC switch circuit is connected to AC power and converts AC into DC. A control switch is connected to the AC power. A computer power supply circuit is connected to the AC power of the control switch and converts the AC into DC. A power output socket is connected to the AC power of the control switch and supplies power to peripheral equipment. A power start-up circuit is connected to the DC power of the DC switch circuit and the control switch, and operates the control switch to transmit AC power. A cluster cable transmits the DC power to the mainframe. A boot button is connected both to the start-up circuit and mainboard, so as to convert the AC into DC for the mainframe and start-up circuit.

2 Claims, 5 Drawing Sheets

COMPUTER POWER SUPPLIER WITH A STANDBY POWER SAVING CONTROLLER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a computer power supplier with a built-in power saving controller to save electric power consumption by the computer mainframe connected to the power supplier. Particularly, the boot button of the computer mainframe can simultaneously activate the electric power supply of the power supplier and the boot function of the computer mainframe, so that, in standby status, the power supply to the computer mainframe and the peripheral equipment connected to it will be completely cut off to save power consumption.

2. Description of Related Art Including Information Disclosed Under 37 CFR 1.97 and 37 CFR 1.98.

A power supplier (A) (as shown in FIG. 1) equipped on a general use computer is configured with an AC socket (B) to connect external AC power and various electronic components (C) (such a power supplier (A) is an existing technique and is not described in detail here) to convert the AC power into constant voltage DC power to be supplied to the computer mainframe through cluster cables (D). When the computer mainframe and the peripheral equipment is in standby status, the power supplier (A) is still connected to the external AC power supply.

However, when the computer mainframe and its peripheral equipment is in standby status, the power supplier (A) is still connected to the AC power, and all electronic components (C) inside still have electric current and still consume electric power, with no energy saving efficacy. Although such a power supplier (A) is configured with a power switch (E), it is configured on the backside of the enclosure of the computer mainframe (A) and is inconvenient to operate. The operator may easily forget to shut it off. Further, the computer peripheral equipment (for example: displayer, multi-media devices, etc.) can be connected to the computer mainframe or be connected to AC power supply through other power sockets. When the computer mainframe is in standby status and the power is not cut off, the peripheral equipment must be shut off by operating the switches of various devices. Such operations are not convenient, and in case the operator forgets to shut off the peripheral equipment by neglect, there will be a waste of energy.

In consideration of the above problems, the inventor of the present invention made detailed research and improvements and disclosed a computer power supplier with a built-in power saving controller.

BRIEF SUMMARY OF THE INVENTION

The primary objective of the present invention is to provide a computer power supplier with a built-in power saving controller, so that the boot button of the computer mainframe can turn on the AC power supply and start the computer at the same time, and the power supplier of the computer mainframe can automatically control the input and output of external AC power supply based on the variation of voltages.

The second objective of the present invention is to provide a computer power supplier with a built-in power saving controller, so that, when the computer mainframe and its peripheral equipment are in standby status, the external AC power supply to various electronic components inside the power supplier can be actually cut off to save consumption of energy.

Another objective of the present invention is to provide a computer power supplier with a built-in power saving controller, so that the external AC power supply to various electronic components inside the power supplier can be cut off when the computer mainframe and its peripheral equipment are in standby status, and their life cycle can be longer.

The present invention has the following technical solutions:

a computer power supplier with a built-in power saving controller, comprising: a power input socket, connected to external AC power supply;

a DC switch circuit, connected to the power input socket to convert the AC power supply into preset voltage DC power supply;

a power control switch, connected to the AC power supply of the power input socket, to turn on or off the AC power supply;

a computer power supply circuit, connected to the power control switch, to convert the AC power supply into DC power supply for the computer mainframe;

a power output socket, connected to the power control switch to introduce the AC power supply from the power input socket for the computer peripheral equipment;

a power start-up circuit, connected to the DC power supply of the DC switch circuit and the power control switch; this power control switch is operated to introduce the AC power supply for the computer power supply circuit;

a power cluster cable, connected to the computer power supply circuit to transmit DC power to the computer mainframe; and a boot button, with its boot contact connected both to the power start-up circuit and to the computer mainboard, so as to convert AC power into DC power for the computer mainframe and the power start-up circuit.

Based on the attached drawings and the following descriptions, feasible embodiments of the present invention are described in detail.

DETAILED DESCRIPTION OF THE INVENTION

Figure 1:
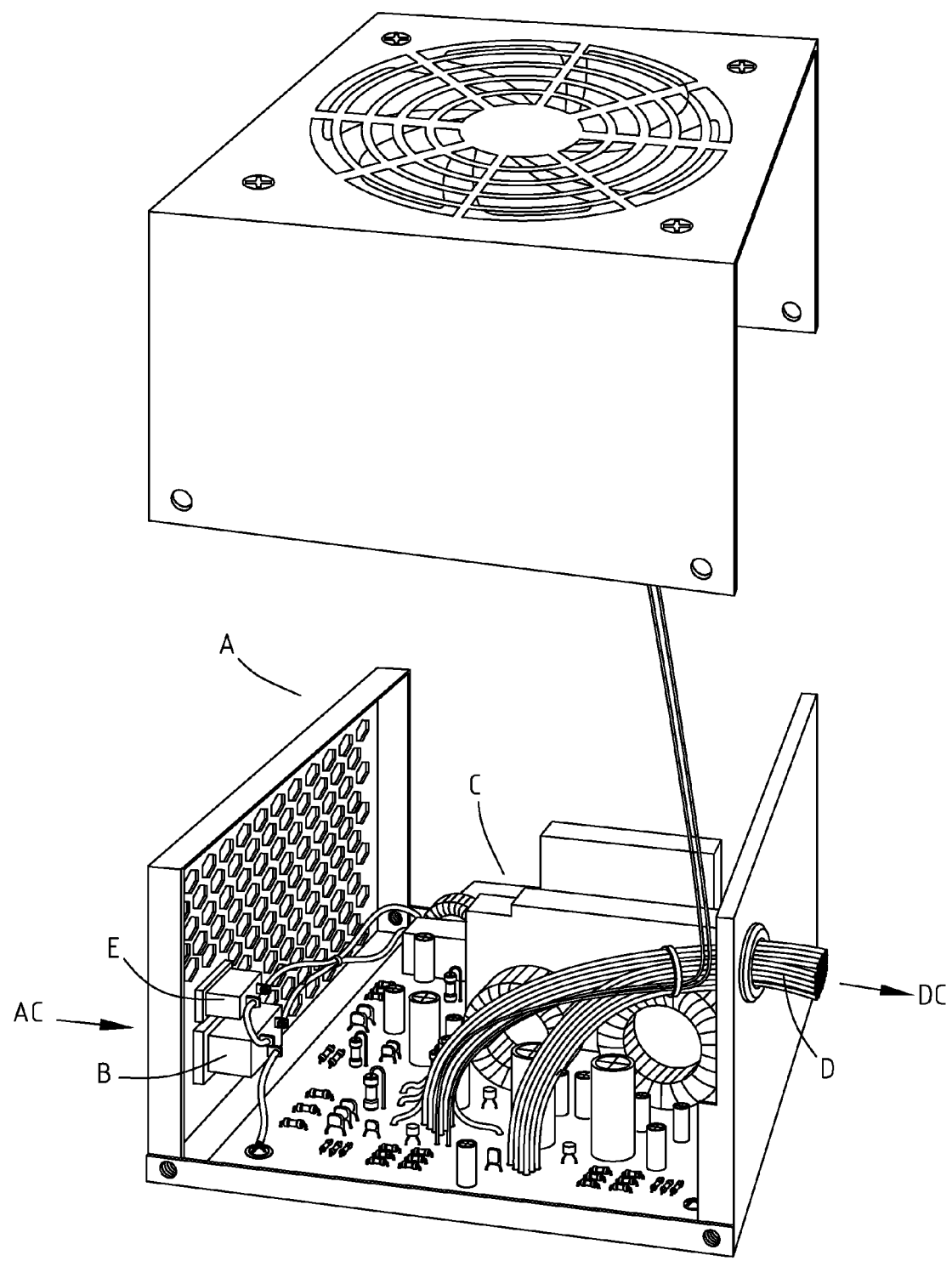
FIG. 1 is an exploded perspective view of a prior art power supplier.
Figure 2:
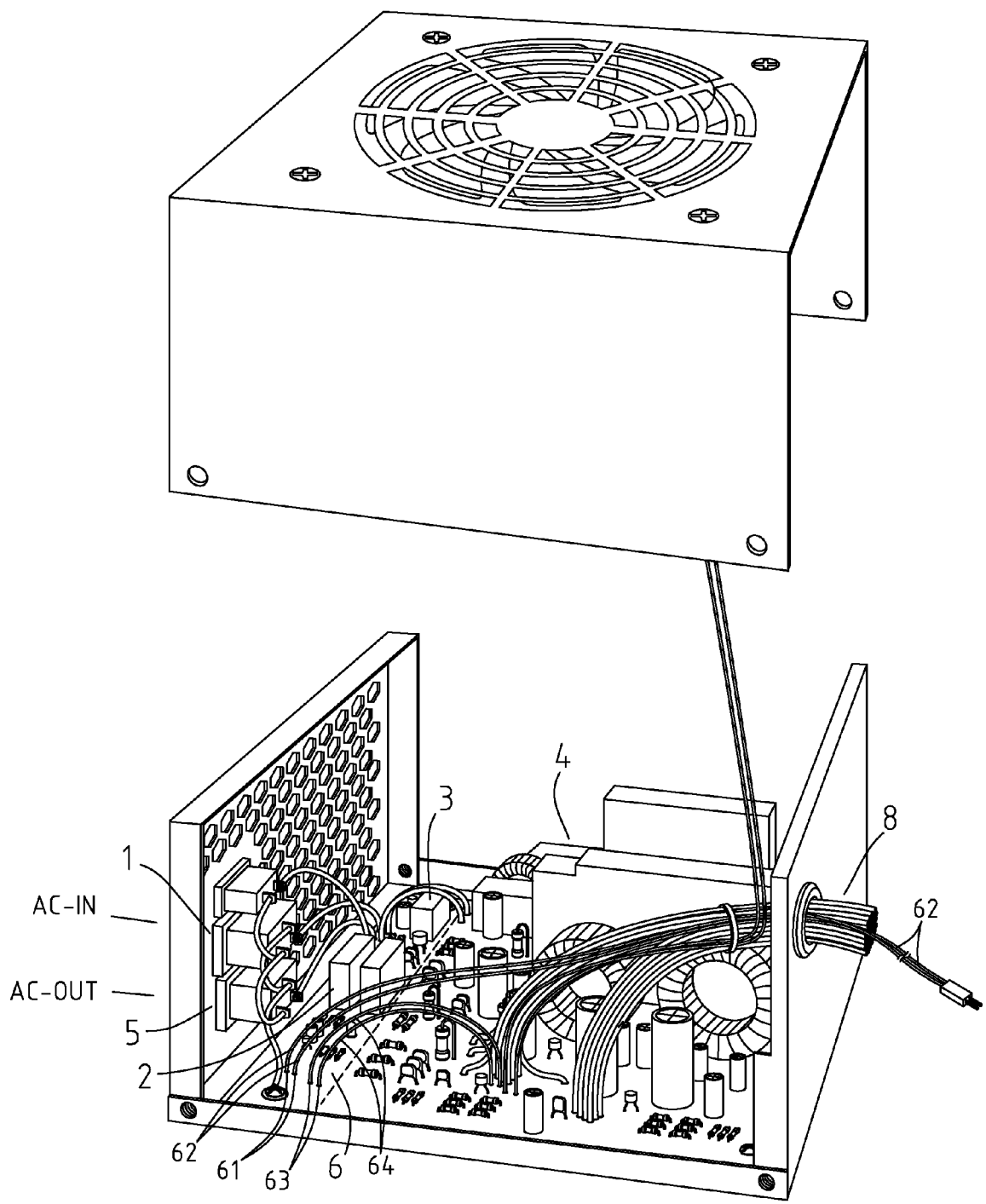
FIG. 2 is an exploded perspective view of the computer power supplier of the present invention.

Referring to FIG. 2-5, the computer power supplier disclosed in the present invention mainly comprises: a power input socket 1, a DC switch circuit 2, a power control switch 3, a computer power supply circuit 4, a power output socket 5, a power start-up circuit 6, a boot button 7, a power cluster cable 8, and a computer mainframe 9.

Figure 3:
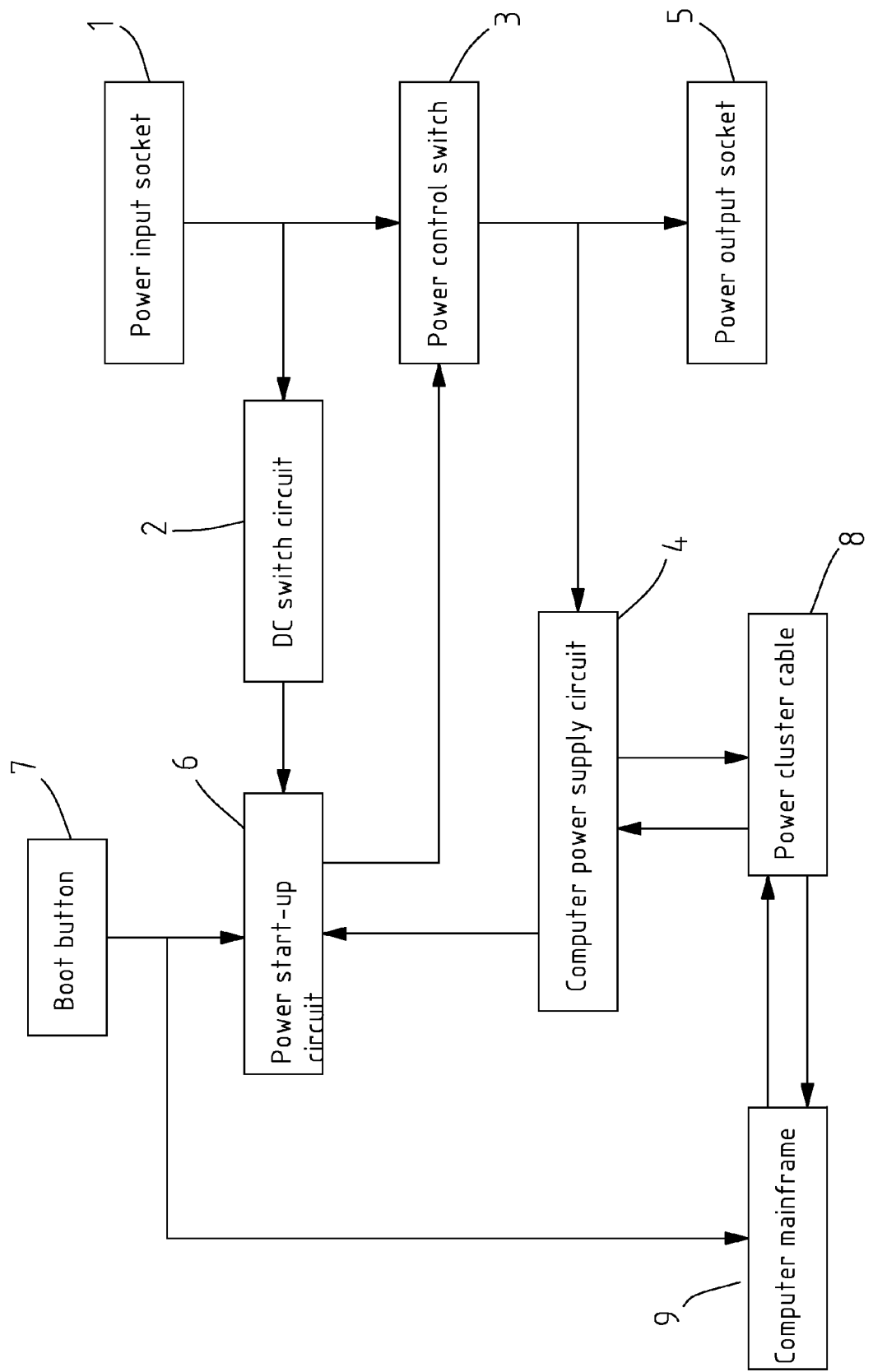
FIG. 3 is a block diagram of the present invention.

Referring to FIG. 3, which is a block diagram of the present invention, the power input socket 1 introduces external AC power and connects to the DC switch circuit 2 and the power control switch 3. The power control switch 3 is further connected to the computer power supply circuit 4 and the power output socket 5. The computer power supply circuit 4 can convert the AC power introduced by the power input socket 1 and output multiple DC voltages to supply power through the power cluster cable 8 to the computer mainframe 9, and the power output socket 5 supplies AC power for the computer peripheral equipment.

The DC switch circuit 2 is connected to the power start-up circuit 6, and the power start-up circuit 6 is configured with a start-up boot terminal 61 leading out a boot transmission line 62 to connect the boot contact 71 of the boot button 7, and is also configured with a start-up sensor terminal 63 leading out a sensor transmission line 64 to connect the computer power supply circuit 4, and the boot contact 71 of the boot button 7 is meanwhile connected to the start-up contact of the main board 91 on the computer mainframe 9.

When the present invention is used to start the computer, by pressing the boot button 7, the boot transmission line 62 of the power start-up circuit 6 and the main board 91 of the computer mainframe 9 will simultaneously transmit the start-up signal (refer to FIG. 2, 5), to operate the power control switch 3 to supply AC power to the computer power supply circuit 4, and then the power is converted into DC power of various voltages, and supplied to the computer mainframe 9 through the power cluster cable 8 (for example: SAT DC voltage, 5V of 20Pin, 12V DC voltage etc), and transmitted to the computer power supply circuit 4 through the sensor transmission line 64 leading out from the start-up sensor terminal 63 of the power start-up circuit 6, and preset voltage DC power is supplied to the power control switch 3 to keep it in working status, so that the AC power supplier will constant supply AC power to the computer power supply circuit 4 and the power output socket 5.

When the computer is shut off, a signal is sent by the computer mainframe 9 through the power cluster cable 8 to shut off the computer power supply circuit 4, and shut off the power of the start-up sensor terminal 63 of the power start-up circuit 6, i.e., the power control switch 3 is turned off to shut off the AC power of the power output socket 5, and only allow the AC power supplier to be connected to the DC switch circuit 2 to supply minimal (about 0.02 W) power for standby power consumption. In the present invention, the boot button 7 is shared by the start-up button or reboot button of the computer mainframe 9.

Figure 4:
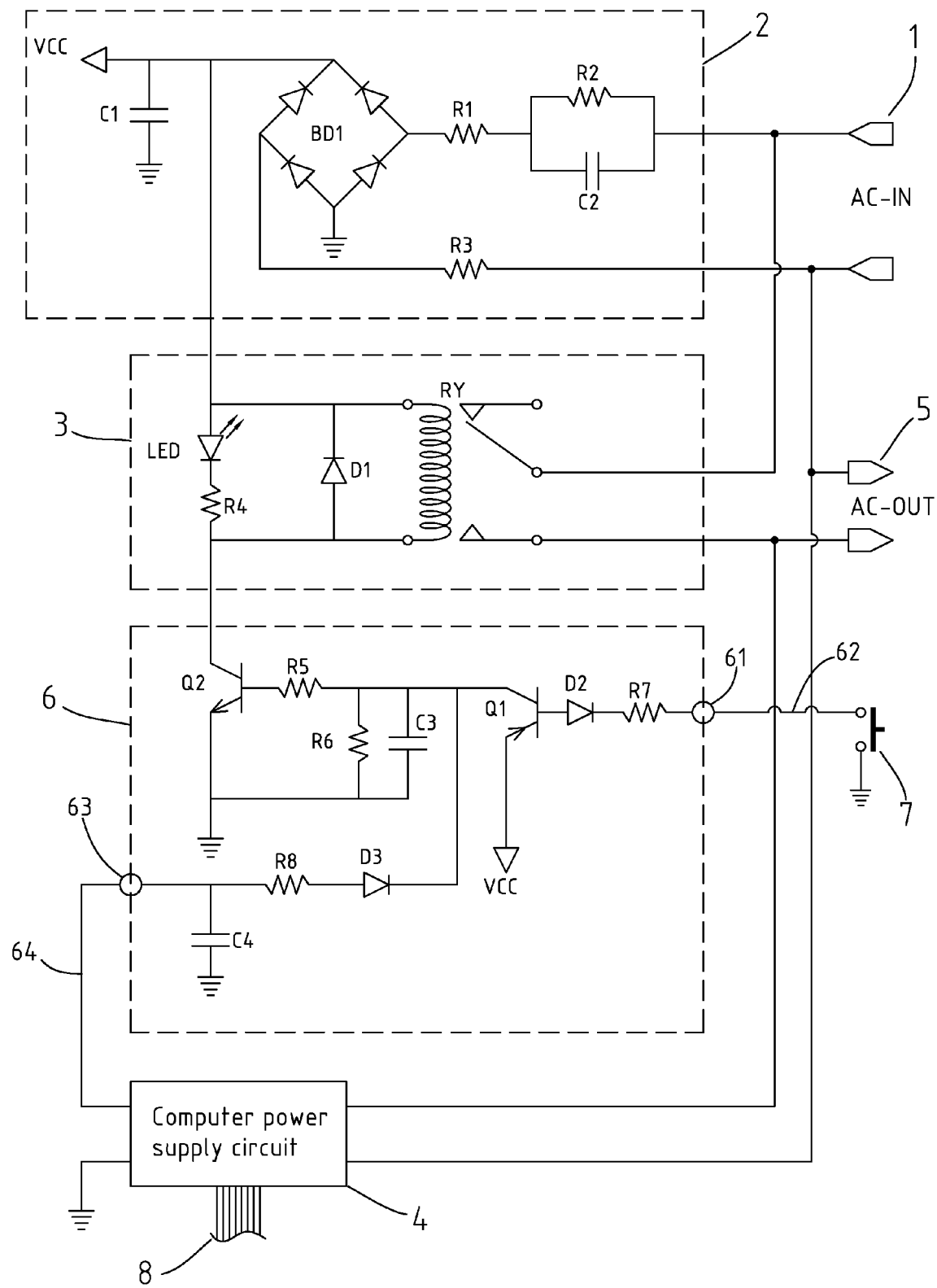
FIG. 4 is a schematic view of an embodiment of the circuit of the present invention.
Figure 5:
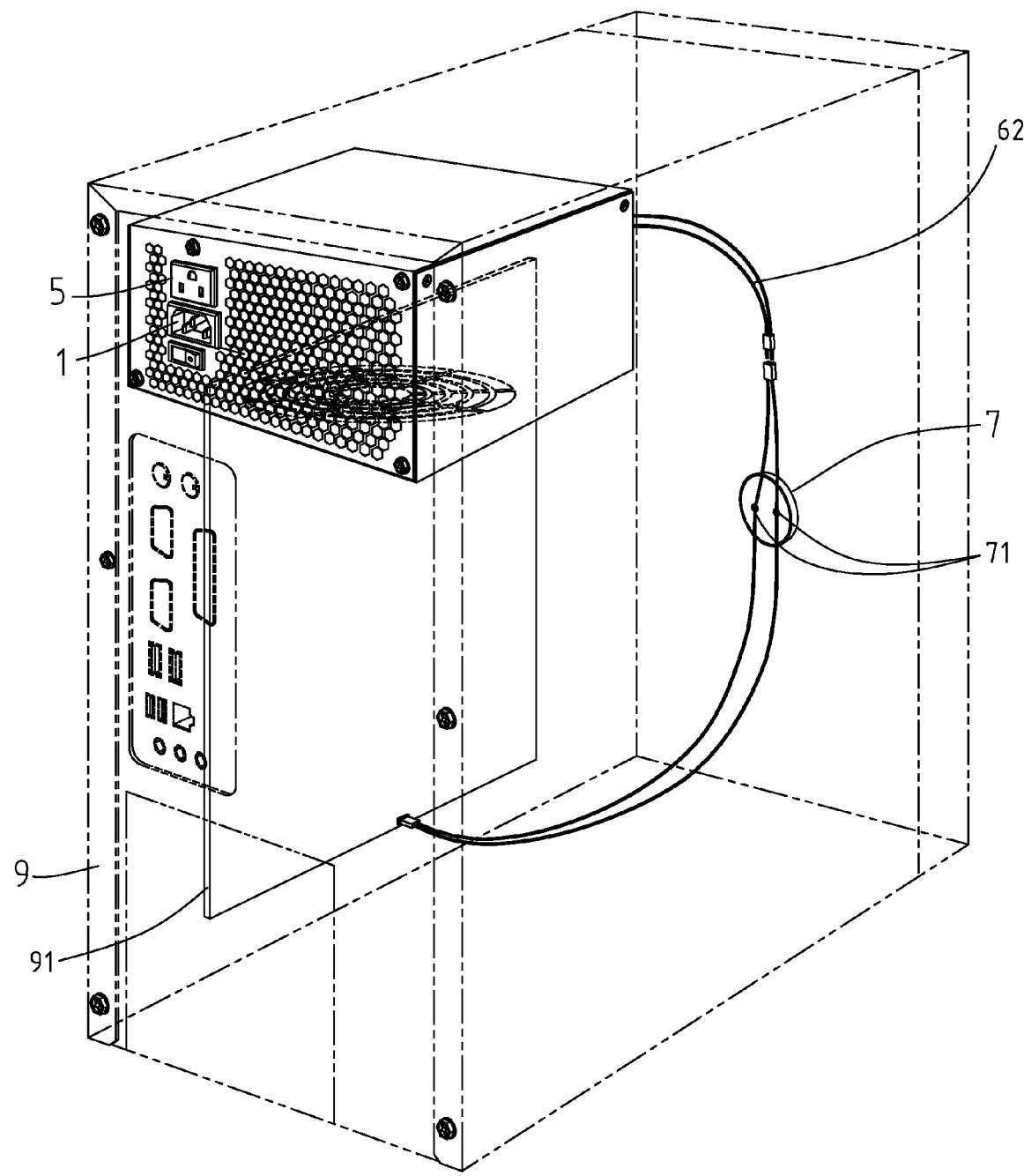
FIG. 5 is an external schematic view of an embodiment of the present invention.

Referring to FIG. 4, an embodiment of the present invention, the DC switch circuit 2 comprises: an AC power input terminal (AC-IN), a bridge rectifier (BD), a resistor (R1, R2, R3), a capacitor (C1,C2), and a DC power supply (Vcc). Based on the AC voltage of the AC power input terminal (AC-IN), the power values of the capacitor (C2) and the resistor (R1, R2, R3) are appropriately matched, and the AC power supply is converted to DC power supply (Vcc) for usage by the power start-up circuit 6.

The power control switch 3 comprises: an LED indicator, a resistor (R4), a diode (D1), a relay (RY), and an AC power output terminal (AC-OUT). When a boot signal is transmitted into the power start-up circuit 6, the relay (RY) will turn on the AC power output terminal (AC-OUT) to output AC power supply for the computer peripheral equipment, and at the same time supply power to the computer power supply circuit 4, which converts the power into multiple types of DC power to start the computer mainframe 9. The LED indicator will show the status of power supply.

The power start-up circuit 6 comprises: a first switch (Q1), a second switch (Q2), resistors (R5, R6, R7, R8), diodes (D2, D3), a DC positive power source (Vcc), a start-up boot terminal 61, a boot transmission line 62, a start-up sensor terminal 63, and a sensor transmission line 64. The boot transmission line 62 leading out from the start-up boot terminal 61 is connected to the boot contact 71 of the boot button 7. Upon starting up, the first switch (Q1) is turned on, DC positive power source (Vcc) is saved into the capacitor (C3), the resistors (R5, R6) are used to extend the discharge time of the capacitor (C3), and extend the start time of the second switch (Q2), and, upon starting up of the second switch (Q2), the power control switch 3 and the computer power supply circuit 4 are activated. Before complete discharge of the capacitor (C3), the sensor transmission line 64 leading out from the start-up sensor terminal 63 and connecting the computer power supply circuit 4 returns multiple DC voltages, and input preset DC voltage power to be supplied to the power control switch 3, so that the relay (RY) will maintain supply of power from the AC power input terminal (AC-IN) to the computer power supply circuit 4 and AC power output terminal (AC-OUT). When turning off the computer, the computer power supply circuit 4 stops to supply power to the start-up sensor terminal 63 of the power start-up circuit 6, even after completion of discharge of the capacitor (C3, C4), the second switch (Q2) will automatically turn off and cut off the power to the relay (RY) of the power control switch 3, and stops the AC power supply to the AC power output terminal (AC-OUT), so as to shut off the power to the computer peripheral equipment. The present invention can also be applied in the power supplier for other electronic equipment for energy saving of the equipment.

With the above-mentioned configurations, functions and purposes, the present invention is more complete and practical than prior art, and the present invention is proved to have features of novelty and inventiveness. The efficacy is enhanced to improve the efficiency of the power supplier, and the power-saving components of the electronic devices are simplified to improve the power-saving effect and working efficiency. By now, there has been no article of identical or similar characteristic published in domestic or overseas publications or publicly used. Therefore the present invention is meeting the prerequisites of the Patent Law.

The mechanical appearance, configurations and overall efficacy disclosed in the present invention for easier description may be altered, replaced or modified, and such alterations, replacements or modifications shall be deemed to be still in the same scope of reflection of the present invention.

We claim:

1. A computer power supplier with a built-in power saving controller for a computer mainframe and for computer peripheral equipment, the computer power supplier comprising:

a power input socket suitable for connection to an AC power supply;

a DC switch circuit connected to said power input socket, said DC switch circuit suitable for converting AC power from the AC power supply into a first DC power with a preset voltage;

a power control switch connected to said power input socket, said power control switch suitable for turning the AC power on and off;

a computer power supply circuit connected to said power control switch, said computer power supply circuit suitable for converting the AC power into a second DC power for the computer mainframe;

a power output socket connected to said power control switch, said power output socket suitable for introducing the AC power from said power input socket to the computer peripheral equipment;

a power start-up circuit connected to said first DC power of said DC switch circuit and to said power control switch, said power start-up circuit configured with a start-up boot terminal leading out a boot transmission line, said power start-up circuit having a start-up sensor terminal leading out a sensor transmission line to connect with said computer power supply circuit;

a power cluster cable connected to said computer power supply circuit so as to transmit the second DC power to the computer mainframe, the second DC power is transmitted with a preset voltage; and a boot button having a boot contact connected to said power start-up circuit and suitable for connection to the computer mainframe such that when said boot button is pressed the power start-up circuit is started first and then the second DC power is introduced to the computer mainframe.

2. The computer power supplier of claim 1, further comprising:

a start-up button suitable for cooperation with the computer mainframe, said boot button being shared with said start-up button.

\* \* \* \* \*